Nov. 6, 1923.
O. E. BARTHEL
1,473,456
BRAKE RIGGING
Filed Dec. 4, 1920
2 Sheets-Sheet 2
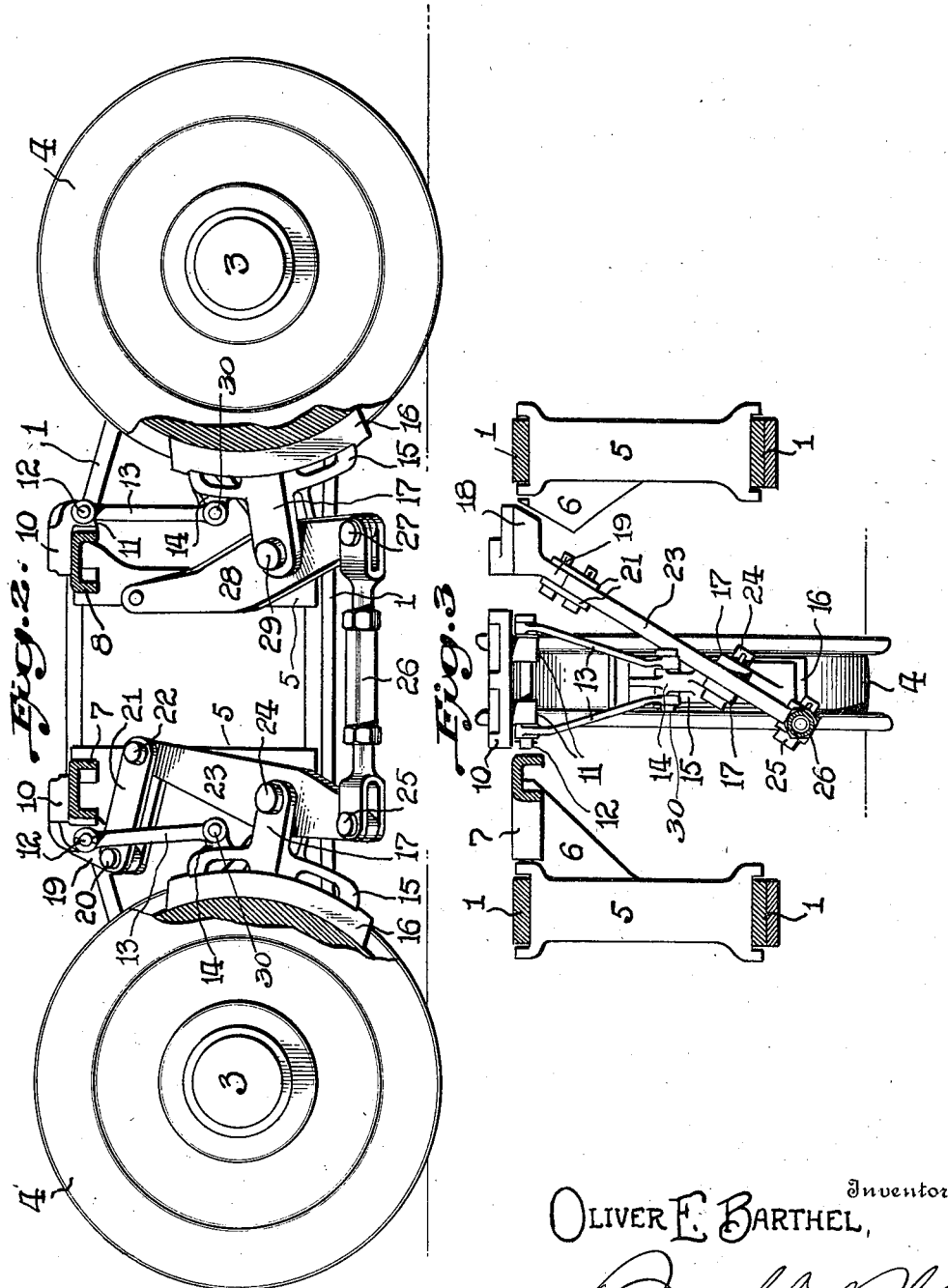
Inventor
OLIVER E. BARTHEL, Patented Nov. 6, 1923.

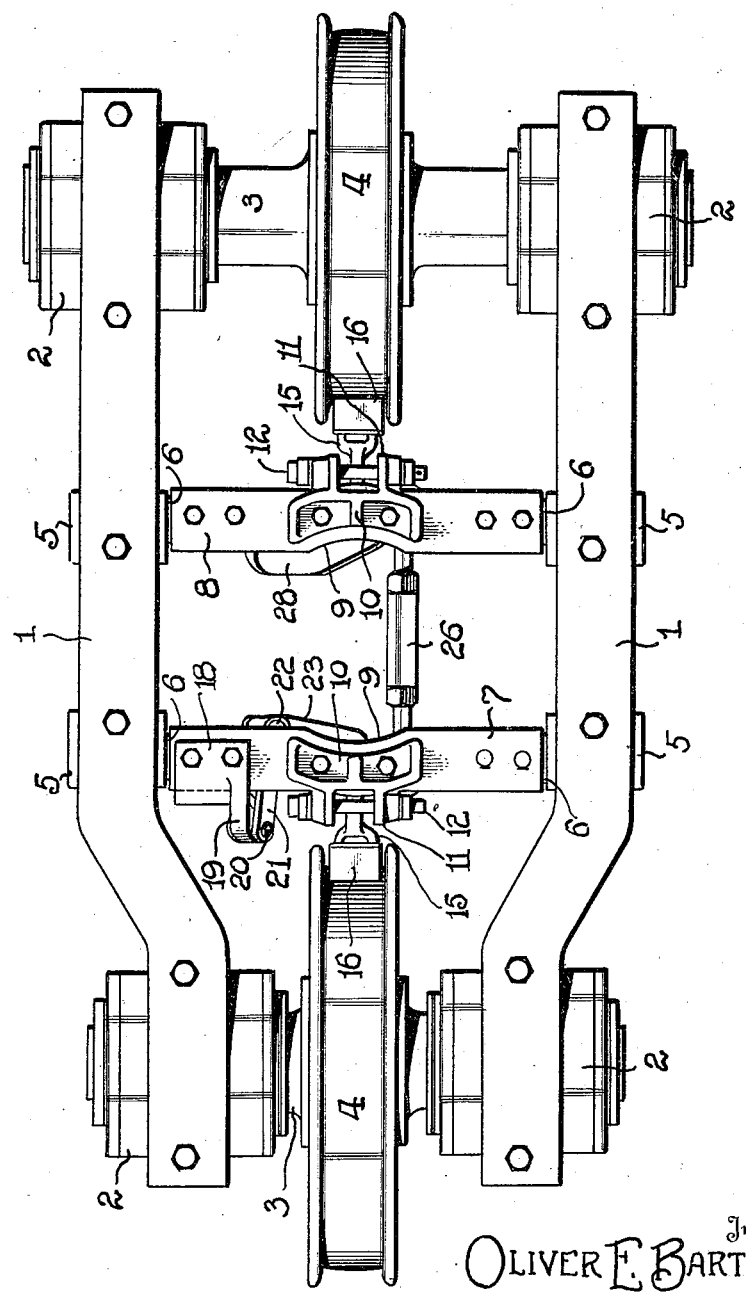

1,473,456

UNITED STATES PATENT OFFICE.

OLIVER E. BARTHEL, OF DETROIT, MICHIGAN.

BRAKE RIGGING.

Application filed December 4, 1920. Serial No. 428,217.

*To all whom it may concern:*

Be it known that I, OLIVER E. BARTHEL, a citizen of the United States of America, residing at Detroit, in the county of Wayne and State of Michigan, have invented certain new and useful Improvements in Brake Rigging, of which the following is a specification, reference being had therein to the accompanying drawings.

The object of this invention is to provide a brake rigging that may be advantageously used in connection with the monorail truck disclosed in companion applications filed under even date, the brake rigging being especially designed to serve wheels disposed one in advance of the other in the central vertical plane of the truck.

Another object of my invention is to provide a brake rigging which is supported from truck transoms, instead of truck bolsters, thereby insuring an even or uniform wear on brake shoes, and a smooth-non-jarring or chattering brake action.

A further object of this invention is to provide a brake rigging which is simple in construction, easy to operate, and of such arrangement as to occupy a comparatively small space in a truck.

The above and other objects are attained by a constructive arrangement of parts to be hereinafter described, and reference will now be had to the drawings, wherein—

Figure 1 is a plan of a brake rigging as applied to a monorail truck;

Fig. 2 is a longitudinal sectional view of a portion of the truck showing the brake rigging in side elevation, and Fig. 3 is a cross sectional view of the truck.

In order that the mounting of the truck rigging may be understood in connection with my improved monorail truck, I show side frames 1 having the ends thereof provided with journal boxes 2 with the axles 3 of double flanged wheels 4 therein, said wheels being one in advance of the other in the central vertical plane of the truck.

Intermediate the ends of the frames 1 are pedestals 5 and movable between the pedestals is a car body supporting bolster which has not been shown for the sake of clearness and brevity.

The upper ends of the pedestals 5 are provided with inwardly projecting brackets 6 supporting transverse inverted channel shaped transoms 7 and 8, said transoms being disposed in parallelism with the inner walls thereof recessed, as at 9, to provide clearance for portions of the bolster.

Mounted on the transoms 7 and 8, in the central vertical plane of the truck, are hanger brackets 10 having apertured sets of lugs 11 provided with pivot pins 12 for brake hangers 13. Each brake hanger is in the form of a set of arms having the upper ends thereof on the pin 12 at the outer sides of the lugs 11, and the lower ends of the arms are in proximity to each other and connected by a pivot pin 30.

On the pivot pin 30 of each brake hanger is an apertured lug 14 of a brake head 15, said brake head having a conventional form of brake shoe 16. The brake head 15 also has a set of apertured arms 17 and these arms are set in planes at an angle to the central vertical plane of the truck, as best brought out in Figs. 2 and 3.

Mounted on the transom 7, at one end thereof, is a dead lever bracket 18 with an apertured depending lug 19, and pivotally connected to said lug by a pin 20, is a set of links 21 which extend under the transom 7 and have the ends thereof pivotally connected, by a pin 22 to an angularly disposed dead lever 23, said lever being disposed at an angle which intersects the central vertical plane of the truck.

The dead lever 23 has its intermediate portion pivotally mounted between the arms 17 of one brake head by a pin 24 and the lower end of said dead lever is pivotally connected, as at 25, to a turn buckle connecting member 26. The opposite end of the turn buckle connecting member 26 is pivotally connected, as at 27, to the lower end of a live member 28, said lever being disposed in the same angular plane as the dead lever and having its intermediate portion pivotally mounted, by a pin 29 between the arms 17 of the other brake head 15. The upper end of the live lever is adapted to be connected to any rod or brake operating element.

In operation, movement of the upper end of the live lever 28 causes the dead lever 23 to be actuated through the medium of the turn buckle connection 26, and assuming that the live lever 28 is shifted in a direction to apply the brake head and its shoe, carried by said live lever, the lower end of the live lever shifts the lower end of the dead lever 23 so that the brake head and shoe carried thereby will be placed in a set position relative to the wheel served by this portion of the brake. This is brought about by the upper end of the dead lever being movedly supported by the links 21 and the dead lever bracket 18, and should the live lever 28 be shifted to release the brakes, the brake heads 15 are actuated in synchronism to retract the brake shoes 16 relative to the wheels 4.

I attach considerable importance to the simplicity of construction entering into the brake rigging since it is possible to mount the same centrally of the truck and thus provide clearance for any other devices that may be associated with the truck. Furthermore, easy access can be had to the brake heads for renewing brake shoes thereof and it is through the medium of the turn buckle connection that the live and dead levers may be adjusted to take up wear on the brake shoes. The brake rigging always has a fixed position relative to the truck frames and wheels and will always maintain the same relative position between the brake shoes and the wheels; that is, the angle formed between the center line of a wheel and a line drawn from the center of the wheel to the center of the brake shoe on the wheel rim is always the same. This insures an even smooth braking action, which cannot be accomplished when brake hangers are fastened to bolsters, since the bolsters have a vertical movement in the truck and would, consequently, change the position of the brake shoes relative to the wheels and cause the brake shoes to chatter and unevenly wear. My invention possesses other advantages than those herein enumerated, and I would have it understood that while the brake rigging has been especially designed for a monorail truck, yet it is applicable to any wheels placed one in advance of the other.

What I claim is:—

1. In a mono-rail truck, truck frames having transoms, wheels between said frames and one in advance of the other in the central vertical plane of the truck, brake heads suspended from the truck transoms between the wheels thereof, and operating means solely supported from said truck transoms for operating said brake heads.

2. The combination of a monorail truck having side frames, wheels between said frames and disposed one in advance of the other, pedestals in said frames, a bolster having its ends movably supported in said frames between said pedestals, transoms carried by said pedestals, hangers centrally of said transoms, brake heads carried by said hangers and confronting said wheels, and articulated live and dead levers connected to said brake heads with said dead lever supported from one of said transoms and the live lever arranged for operation from a remote point, said brake operating mechanism being solely supported from said transoms independent of said truck frames.

In testimony whereof I affix my signature in presence of two witnesses.

OLIVER E. BARTHEL.

Witnesses:
 ANNA M. DORR,
 KARL H. BUTLER.